April 10, 1945.  E. T. ALLEN ET AL  2,373,089

STALL DELAYING AND INDICATING MECHANISM

Filed Nov. 2, 1940

Inventors
Edmund T. Allen
By Robert J. Minshall
Reynolds & Beach
Attorneys

Patented Apr. 10, 1945

2,373,089

UNITED STATES PATENT OFFICE 2,373,089

STALL DELAYING AND INDICATING MECHANISM

Edmund T. Allen and Robert J. Minshall, Seattle, Wash., assignors to Boeing Aircraft Company, Seattle, Wash., a corporation of Washington Application November 2, 1940, Serial No. 364,090

8 Claims. (Cl. 177—311)

There have been numerous attempts to indicate to the pilot of an airplane when stall conditions arise. Some indicating devices depend upon the attitude or angle of attack of the airfoil; some are located in the nose portion of the airfoil, or ahead thereof, and depend upon difference of pressure; some depend upon airspeed. No stall indicator as heretofore proposed has to our knowledge gone into practical use, perhaps for the reason that either they are affected by conditions other than stall, and hence may give a false indication, or they are so insensitive to the inception of a stall that the stall is substantially complete before an indication is given, which is too late.

For instance, in straight-away flight, an angle of attack which with flaps up will produce a stall, with flaps down may not produce a stall, yet a device sensitive to attitude, or to pressure distribution at the nose, would ordinarily, in either such case, indicate a stall. This indication would be correct in the first instance, but wrong in the second. Where it was right, it might still be too late. Where it was wrong it would be misleading, and would tend to produce doubt even when an actual stall occurs, until too late.

A stall may occur in gusty air, such as will give the airplane an acceleration of 1.5 G, the usually accepted design factor. If a plane is designed so that stall will not occur above 60 M. P. H., in gusty air the stall may occur at 60√1.5 M. P. H., or approximately 68 M. P. H. A plane coming in for a landing at 65 M. P. H. for instance, would be safely above the normal stalling speed, yet in gusty air would be below the actual stalling speed. A stall indicator based upon air speed would be entirely inadequate and erroneous under such conditions.

Again, we may consider a plane having a stalling speed of 60 M. P. H., with an air speed indicator operating as a stall indicator, accomplishing a 60° banked turn. Stall occurs in such accelerated flight at $$60\sqrt{\frac{a}{G}}$$

where $a$ is the acceleration, and the acceleration in a 60° bank is 2G. Stall in such a case occurs at approximately 85 M. P. H., and if the stall indicator of the air speed type is set to indicate a stall at 60 M. P. H., quite clearly it is totally useless when stall actually occurs under such conditions at 85 M. P. H.

It is the primary aim of the present invention to provide a means adaptable to any airfoil which will give an indication to the pilot as soon as a stalling condition occurs, under any or all flight conditions, and before it has been more than initiated at any critical location upon the airfoil, and which is affected only and directly by stall conditions, so that it will not give a false indication.

More specifically, and since a stall is created by or is accompanied by a reversal of flow over a surface or disturbance of smooth flow over it, known as "burbling," and consequent destruction of lift, it is an object to provide a stall indicator sensitive to stalling flow conditions. Such indicator or indicators are located at a point or points in the surface where stalling or "burbling" flow commences, usually along the trailing edge of the airfoil, but sometimes at the airfoil tip, or ahead of a movable control surface, which, at the inception of reversal of flow in any such area will be actuated to give an unmistakable indication. Ordinarily stall characteristics do not occur at all these locations simultaneously, but, depending on conditions of the air and the flight attitude of the aircraft, approach to a general stall will be indicated by the occurrence of partial or local stalling in one or more of such locations.

Stall delaying or corrective devices have been employed heretofore, frequently in the nature of slot-forming or slot-opening arrangements. These have sometimes been automatically operable, primarily in accordance with pressure conditions, which may be an indirect result of a stalled attitude, but which are not a direct result of a stall. A secondary object of our invention is to provide a stall delaying device, conveniently but not necessarily taking the form of a slot-opening means, which is controlled by and sensitive to the devices referred to above, the actuation of which under stalling flow conditions, and at the initiation of a stall, would operate the indicating means. The operation of the stall-delaying devices would ordinarily be an additional and secondary function of the flow-sensitive devices, but it is not outside our invention that, in some cases, it be their sole function.

As pointed out above, stall conditions may occur unexpectedly and spread rapidly after being initiated. For this reason it is desirable that the pilot have immediate warning of their inception. Nevertheless, if the airplane has considerable momentum toward a stalling attitude, such as in entering abruptly into a sharp climb or a steep banking turn, aggravated stall conditions may occur before the normal controls, manipulated by the pilot, are able to remedy the situation. Instead of relying upon the pilot alone to correct the condition after seeing the warning, the automatic stall delaying means acts instantaneously, for example by opening a slot in the forward portion of the wing, to prevent spread of the stall conditions, and to quell them despite continuing increase of angle of attack. This gives the pilot sufficient time to apply measures for correcting the airplane's attitude through the medium of the control surfaces before the stall becomes dangerous.

Although under such conditions opening of the slot will ordinarily prevent further spread of stall conditions toward the leading edge of the wing, and almost immediately begin to restrict the extent of the stall responsible for initiating slot opening, nevertheless it may take an appreciable length of time for the stall effect to be eliminated entirely. Only then will the warning device be deenergized, indicating to the pilot that the stall has been overcome. All this may occur, however, before controls manipulated by the pilot have become effective to alter the attitude of the airplane sufficiently to overcome the stalling conditions by such maneuver.

The arrangement shown in the drawings is largely diagrammatical, and is prepared for the purpose of illustrating the principles of our invention rather than for the purpose of indicating a practical and operative device.

Figure 1:
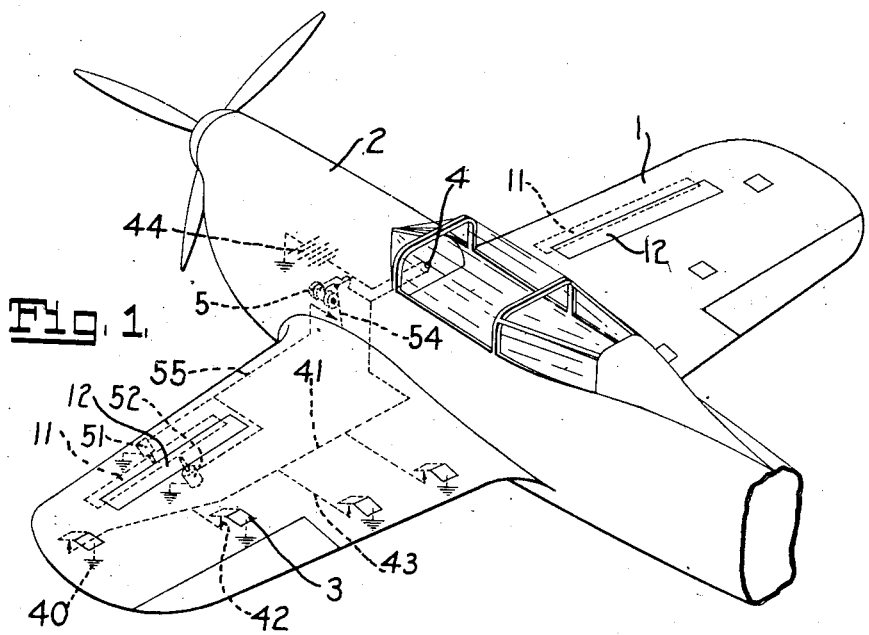
Figure 1 is a perspective view of an airplane, showing our invention incorporated therein.
Figure 2:
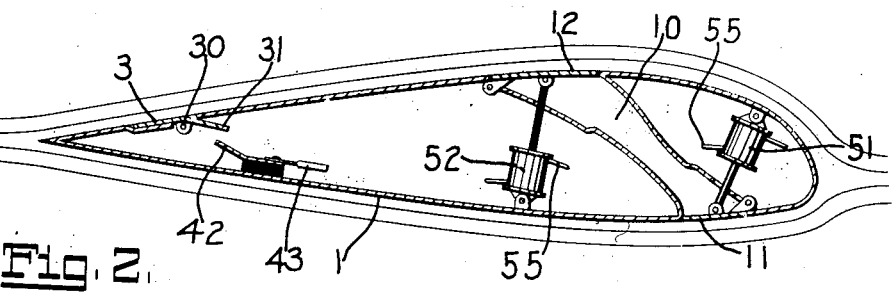
Figure 2 is a section through an airfoil equipped with our invention, showing parts in the position they would occupy during normal flight.

In normal flight airflow over the upper skin of a sustaining airfoil (as illustrated in Figure 2) follows approximately the contour of the wing section, and joins the airflow over the under skin of the airfoil, at the trailing edge, with a minimum of disturbance. The airflow over the upper skin of the airfoil is therefore always and at all points substantially in a single rearward direction. A stall is produced by, or is accompanied by, a lessening of flow, or a reversal of flow, over the upper skin in the region where the boundary layer is thickened, as we have attempted to illustrate in Figure 3. A definitely different flow condition exists during the stall, as distinguished from normal flow conditions. While this may be considered as a pressure effect in the trailing edge portion, it is more convenient to think of it as a flow effect, which primarily it is, since it is the alteration in flow characteristics which causes the variation in pressure. A stall usually commences adjacent the trailing edge, and the affected area may at first be so restricted in extent, and the departure from smooth flow conditions so slight, that the lift of the wing as a whole is not materially affected, nor is the stall noticeable to the pilot by a change in the performance of the aircraft, but the stall area may spread more or less rapidly and abruptly, toward the leading edge and transversely, until the lift of the wing is negatived or destroyed. It is in the initial stages of a stall that it is desirable to indicate such a condition to the pilot, so that he may take corrective measures, and according to our invention this end is accomplished by flow-sensitive means located substantially in—that is, flush with—the upper surface to be sensitive to flow thereover, and to be held by that flow in one position during normal flight, but upon lessening of flow, or reversal of flow, or a tendency to reversal, such as accompanies or precedes a stall, this flow-sensitive device is caused or permitted to shift or move outward, and its movement is thereby capable of initiating any sort of signal that may be desired. Indeed, its movement under such circumstances is capable of initiating, additionally or alternatively, the action of stall delaying or quelling means, which may be normally inactive or inoperable. Such means may themselves overcome the stalling flow conditions before corrective measures taken by the pilot in response to the warning become effective to counteract the stall, and thus serve as an automatic, emergency device to prevent loss of control simultaneously with the warning. This, then, constitutes the principle of our invention.

The invention is illustrated in connection with a sustaining wing 1, carrying the fuselage 2, which wing is shown as provided with a slot 10 adjacent its leading edge. This slot, however, is preferably normally closed by slot closures 11 and 12, respectively. As has been indicated, the slot 10 and the slot closures 11 and 12 may or may not be employed, as may be preferred, the invention in its primary aspect residing in the provision of an indicator, and only secondarily in the provision of automatically operable stall delaying or correcting means, such as the slot and slot closures.

In the upper skin of the wing, in one or more locations such as will be discussed hereafter, we provide flow-sensitive means, typified by the light tab 3 pivoted at 30 ahead of its rear end, and in normal flight lying substantially flush with the upper surface of the wing. This position of the tab is ordinarily maintained by the normal airflow over it, but the tab must, statically by such a device as a spring or by its weight, or dynamically by reversed airflow under "burbling" conditions, be predisposed to shift to a different position upon interruption of smooth, normal airflow and initiation of stalling airflow. This tab may be made very small and light, and have a forward projection 31 inside the wing serving as a counterbalance, the weight and balance of the tab as a whole being such that the exterior tab portion tends to rise, yet by even slight, smooth flow past it in a rearward direction, as indicated in Figure 2, it will be held down substantially flush with the skin, and in this position of normal flight its contact finger 31 is held away from a complemental contact 42 within the wing. Other means to assist in holding the tab 3 in its normal position, or in inducing its movement toward the abnormal position shown in Figure 3, may be employed, if desired or required, the objective being to provide a means which requires but a small force, such as arises from "burbling," or a reversal of airflow, to move it from the normal position of Figure 2 to the stall indicating position of Figure 3.

Several such tabs may be employed, and preferably are employed in conjunction with each airfoil. This will depend in large degree, and their location upon the wing will likewise depend, upon the design of the particular airfoil and of the airplane as a whole. They should be located in such position as in the particular design experience, wind tunnel tests, or other calculations show will be the points at some one or more of which stall is initiated under various flight conditions. Stall may occur, for instance, with flaps up and power on at one location, but at a different location with flaps down and power off. Similarly tabs may be located at the points where stall is initiated with flaps down and power on, or with flaps up and power off, and such a tab should be located at any spot where, under any given flight condition, stall may first occur.

Preferably each such tab is connected in parallel in a single electrical circuit or equivalent means, so that when any one of them is actuated, by stalling turbulent or reversal of flow, a signal or indicator 4, which is typified by the red light on the dash in front of the pilot, will be energized. For example, each such tab 3 is grounded as indicated at 40, and adjacent and in the path of movement of each contact finger 31 there is positioned a complemental contact 42, previously referred to, which by its individual connection 43 is connected to a common lead 41, leading to the signal 4 and to the grounded power source diagrammatically indicated at 44. By this or any equivalent arrangement, when any one of the contact fingers 31 contacts its complemental contact 42, due to the rising of its tab 3, the signal at 4 is energized, and the pilot is informed immediately that a stall condition is imminent or has already been initiated. The signal, of course, may be any other type of signal, for instance, an audible signal, or several types of signal may be employed, all initiated by the raising of one or more of the tabs 3. Each tab may energize a different signal to indicate at which tab location stalling conditions first occur under a given set of circumstances, so that the most appropriate steps may be taken to correct the condition.

Figure 3:
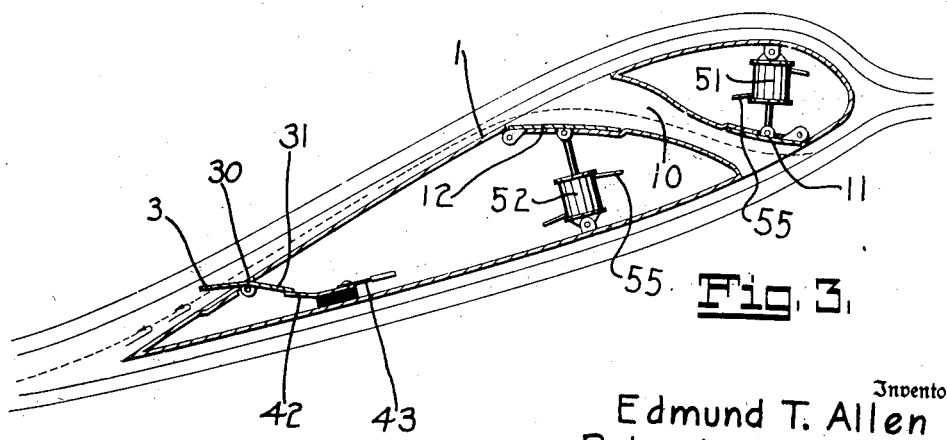
Figure 3 is a similar view, showing the position parts would assume under stall conditions.

It is possible to have the same circuit energize a relay 5, thereby closing a switch 54 and energizing a line 55 leading to solenoids 51 and 52, respectively, which are connected to the respective slot closures 11 and 12. Means are provided to maintain these slot closures normally in slot-closed position, but upon energization of the solenoids 51 and 52, initiated by the rising of a tab 3, these slot closures are moved to slot-open position, as shown in Figure 3, and thereby the stall is automatically delayed or quelled. At the same time in the arrangement shown a signal is given to the pilot, to apprise him of the opening of the slot.

As pointed out above, however, the stall may occur while the conditions inducing it are increasing, such as by a rapidly increasing angle of attack in a climb, or a steep bank. In such case the stalling conditions would tend rapidly to become more aggravated so that a complete stall might occur even though the pilot made every effort to remedy the condition the instant he was warned by the indicator of the initiation of stall conditions. Despite such instantaneous warning, therefore, the airplane might get out of control before forces created by the normal controls could appreciably affect the situation. Under such circumstances the automatic slot opening means, 51 and 52, actuated simultaneously with energization of the indicator, would arrest farther progress of the stall before the pilot could take appropriate remedial measures.

It is quite likely that the stalling conditions would not be completely overcome instantaneously, particularly if the angle of attack continued to increase, because of the airplane's momentum toward a stall-producing attitude. Nevertheless opening of the slots would deter progression of the stall over the leading portion of the wing, and would subdue the stalling conditions more or less rapidly. When these have been quelled to an extent sufficient to permit all flaps 3 to return to their lowered position the signal 4 would be deenergized, indicating to the pilot that the stall has been substantially overcome. Simultaneously the slots 10, having served their purpose, would be closed. If the stall-inducing conditions persisted, however, so that a tab 3 was again lifted, the slots would open once more, and the pilot would be warned of the recurrence of danger.

We desire to point out that this stall indicator is not governed by the attitude of the airfoil, nor by pressure conditions, nor by airspeed, but wholly by flow conditions, and that it is actuated directly by "burbling" or the reversal of flow which is an essential manifestation of the initial stages of a stall. Further the tabs are so located, each in its own localized area where stall conditions may be initiated under given flight conditions, that each tab will give a proper signal at the initiation of the stall and before it has spread or progressed to a dangerous degree.

We should like to point out also that stalls occur not only in sustaining airfoils, but in other airfoils (as the tail surfaces) as well, and the same principles may be employed to indicate stalls in all such airfoils.

What we claim as our invention is:

1. In combination with an aircraft airfoil, flow-sensitive means disposed in a localized area of the surface thereof, unaffected by changes in static pressure on such area, and movable by air flow over such area, normally inoperative stall-delaying means operable to induce smooth air flow over said airfoil at its critical angle of attack, and means operable during flight of the aircraft in response to only that movement of said flow-sensitive means effected by stalling air flow over such surface area, to initiate automatically operation of the stall-delaying means to quell the stalling character of the air flow.

2. Actuating mechanism for a normally inoperative stall-delaying device operable to induce smooth air flow over an aircraft airfoil at its critical angle of attack, comprising flow-sensitive means disposed in a localized area of the airfoil surface, unaffected by changes in static pressure on such area, and movable by air flow over such area, and means operable during flight of the aircraft in response to only that movement of said flow-sensitive means effected by stalling air flow over such surface area to initiate automatically actuation of the stall-delaying device to quell the stalling character of the air flow.

3. In combination with an aircraft airfoil, flow-sensitive means disposed in a localized area of the surface thereof, unaffected by changes in static pressure on such area, and movable by air flow over such area, normally inoperative stall-delaying means operable to induce smooth air flow over said airfoil at its critical angle of attack, means operable during flight of the aircraft in response to only that movement of said flow-sensitive means effected by stalling air flow over such surface area, to initiate automatically operation of the stall-delaying means to quell the stalling character of the air flow, and indicating means operable during flight of the aircraft in response to such movement of said flow-sensitive means effective to initiate operation of said stall-delaying means to indicate the occurrence of a stalling condition, and thereafter operable by said flow-sensitive means in response to its movement effected by said stall-delaying means in quelling stalling air flow over such surface area, to indicate cessation of the stalling condition.

4. Actuating mechanism for a normally inoperative stall-delaying device operable to induce smooth air flow over an aircraft airfoil at its critical angle of attack and for an indicator to indicate a stalling condition of such airfoil, comprising flow-sensitive means disposed in a localized area of the air foil surface, unaffected by changes in static pressure on such area, and movable by air flow over such area, and means operable during flight of the aircraft in response to only that movement of said flow-sensitive means effected by stalling air flow over such surface area both to initiate automatically actuation of the stall-delaying device to quell the stalling character of the air flow and to actuate the indicator to indicate the presence of a stalling condition, and thereafter operable by said flow-sensitive means in response to its movement effected by said stall-delaying means in quelling stalling air flow over such surface area, to indicate cessation of the stalling condition.

5. In combination with an aircraft airfoil, flow-sensitive means disposed in a localized area of the surface thereof, unaffected by changes in static pressure on such area, and movable by air flow over such area, a normally closed slot through the leading portion of the airfoil operable when open to induce smooth air flow over said airfoil at its critical angle of attack, and means operable during flight of the aircraft in response to only that movement of said flow-sensitive means effected by stalling air flow over such surface area, to effect opening of said slot automatically to quell the stalling of the air flow.

6. Actuating mechanism for a normally inoperative stall delaying device operable to induce smooth air flow over an aircraft airfoil at its critical angle of attack, comprising a plate disposed adjacent the trailing edge of the air foil and hinged about an axis substantially perpendicular to the air flow over the trailing portion of the aifoil so that in response to rearward flow of air thereover during flight said plate swings rearward into a position wherein it is substantially coplanar with the adjacent surface portion of the airfoil, and in response to forward flow of air over the trailing portion of the airfoil at or above its critical angle of attack said plate swings upward, and means operable during flight in response only to upward swinging of said plate, induced by stalling air flow over the trailing portion of the airfoil, to initiate automatically actuation of the stall delaying device to quell the stalling character of the air flow over the airfoil's trailing portion.

7. In an aircraft, an airfoil, an element movably mounted upon and having a normal position relative to said airfoil in which position it is unaffected by the static pressure of the air and from which position it is movable only in response to stalling air flow over the portion of the airfoil upon which it is mounted, and means operable by movement of said element induced by stalling air flow over said portion of said airfoil to quell stalling of the aircraft.

8. In an aircraft, an airfoil, a plate element pivotally mounted upon and having a normal position relative to said airfoil in which position it is unaffected by the static pressure of the air and from which position it is swingable only in response to stalling air flow over the portion of the airfoil upon which it is mounted, and means operable by movement of said element induced by stalling air flow over said portion of said airfoil to quell stalling of the aircraft.

EDMUND T. ALLEN.
ROBERT J. MINSHALL.